No. 697,531. Patented Apr. 15, 1902.
J. E. NORWOOD.
SIDE BEARING FOR CARS.
(Application filed Aug. 12, 1901.)

(No Model.)

Witnesses,
Robert Everett,
Dennis Sumby.

Inventor,
John E. Norwood,
By James L. Norris
Atty.

THE NORRIS PETERS CO., PHOTO-LITHO., WASHINGTON, D. C.

UNITED STATES PATENT OFFICE.

JOHN E. NORWOOD, OF BALTIMORE, MARYLAND, ASSIGNOR TO BALTIMORE BALL BEARING CO., OF BALTIMORE, MARYLAND, A CORPORATION OF MARYLAND.

SIDE BEARING FOR CARS.

SPECIFICATION forming part of Letters Patent No. 697,531, dated April 15, 1902.

Application filed August 12, 1901. Serial No. 71,776. (No model.)

*To all whom it may concern:*

Be it known that I, JOHN E. NORWOOD, a citizen of the United States, residing at Baltimore city, in the State of Maryland, have invented new and useful Improvements in Side Bearings for Cars, of which the following is a specification.

My invention is designed for the production of an improved antifriction side bearing for cars, the object of the same being to provide novel means for securing a broad bearing between the antifrictional devices and the coöperating bearing-plate and to provide novel means whereby the antifrictional devices are automatically returned to their normal central operative positions by gravity.

A further object of the invention is to provide novel means for the automatic discharge of dust or dirt which may gain access to the bearing parts and to simplify and cheapen the construction of the bearing as a whole.

The details of the invention will be hereinafter described, and the novel features thereof will be set forth in the claims.

Figure 1:
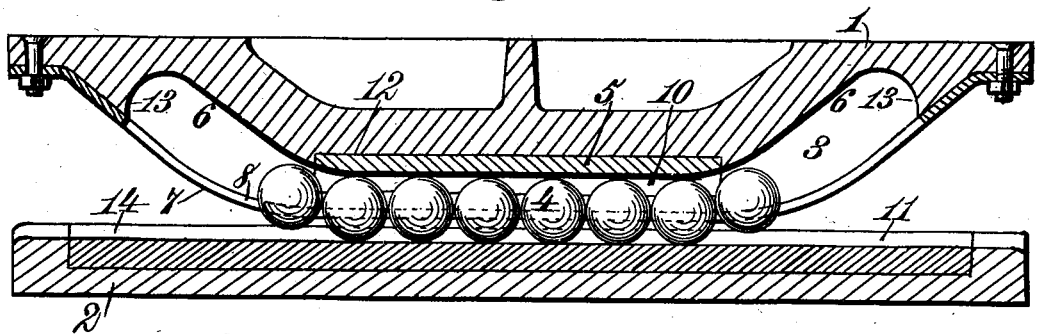
Figure 2:
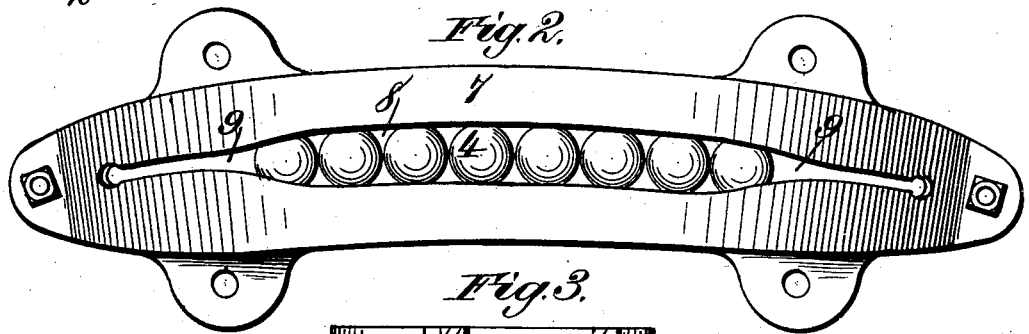
Figure 3:
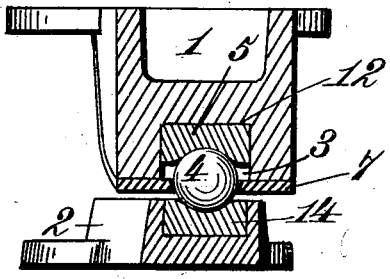
Figure 4:
Figure 5:
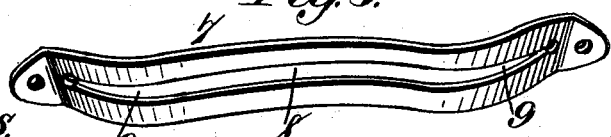

In the drawings forming part of this specification, Figure 1 is a longitudinal section of my improved bearing. Fig. 2 is a bottom plan view of the upper member of the bearing. Fig. 3 is a transverse sectional view of the bearing, and Figs. 4 and 5 are perspective views of details of construction.

Like reference-numerals indicate like parts in the different views.

My improved bearing is made up of the upper member 1, designed to be secured to the body-bolster of the car, and the lower member or bearing-plate 2, designed to be secured to the truck-bolster of the car. Each of said members is provided with lugs or ears, through which the securing means therefor may be passed.

The upper member 1 of the bearing is provided with a longitudinally-extending channel or race 3, in which the balls 4 or other equivalent antifrictional devices are located. The said groove or channel is formed in the lower surface of the member 1 and is longitudinally curved upon the arc of a circle of which the king-bolt of the car is the center. The central portion of the channel 3 is flat or horizontal and is provided with a removable wear-plate 5, while the end portions of said channel are upwardly inclined, as shown at 6. Secured to the under side of the member 1 and designed to retain the balls 4 in place within the channel 3 is a plate or cover 7, having a longitudinally-extending slot or opening 8 therein, through which the balls 4 are adapted to project. The said opening 8 is narrower than the balls 4, so that while said balls may project therethrough it is impossible for them to escape through said opening. The opening 8 is formed with tapering ends 9, as clearly shown in Figs. 2 and 5 of the drawings. The plate 7 lies substantially parallel throughout its length with the base-walls of the channel 3—that is, its central portion is horizontal and parallel to the wear-plate 5, and its ends are upwardly inclined, so as to lie substantially parallel with the end portions 6.

Now it will be observed that when my improved bearing is in use an elongated bearing-surface is provided between the several balls 4, which are opposite the wear-plate 5 and the member 2 of the bearing. It will also be observed that during the relative turning movements of the truck and body the bearing-point between the two parts of the device will remain central—that is, there will always be some of the balls 4 beneath the wear-plate 5. It will be noted, further, that during the relative movements of the truck and body in one direction or the other some of the balls 4 will be moved up into one of the inclined end portions 6 of the channel 3, but that as soon as contact between the two parts of the bearing is relieved said balls will automatically return to their normal central positions by gravity, the same rolling upon the inclined ends of the plate or cover 7. It is therefore impossible for the balls to become seated in and remain at either end of the channel 3, so as to render the bearing inoperative or in danger of breakage. By reason of the fact that the end portions 6 of the channel 3 and the opposite ends of the plate or cover 7 are inclined any dust or dirt which may gain access to the interior working parts of the bearing will be moved downwardly upon the inclined surfaces of these parts and be discharged through the opening 8 in said plate or cover 7.

The lower surface of the wear-plate 5 is preferably formed with a curved groove 10, and the upper surface of the member 2 is preferably formed with a curved groove 11. The transverse curvature of the grooves 10 and 11 conforms to the spherical curvature of the balls 4, so that contact between said balls and the wear-plate 5 and bearing-plate 2, in contact with which they move, includes a large proportion of the surface of said balls. This construction is found of advantage, as it prevents the unequal wear or flattening of any of the bearing parts. The wear-plate 5 is preferably constructed of hardened steel and is seated in a socket or recess 12 in the member 1. When the same becomes worn, therefore, it may be readily removed and a new one substituted for it. As the greater portion of the wear of the bearing comes upon the plate 5, this is an important feature of construction, as it enables the bearing to be practically renewed throughout by the renewal of a single part.

By reason of the extreme simplicity in construction of my improved bearing and the fact that it is composed of few parts the same may be made at a low cost. This is an important feature of advantage. It should be stated in this connection that the end portions 6 of the channel 3 in the upper member 1 are formed with concave end walls 13, producing pockets. These pockets, or rather those portions thereof which lie adjacent to the plate or cover 7, serve to prevent the balls 4 in the channel 3 from being forced out into contact with the inner surface of said plate or cover 7. In other words, by the provision of the concave walls 13 pressure of the balls upon the inner surface of the plate or cover 7 is prevented. It should also be stated that the lower bearing-plate 2 may be provided, if desired, with a removable wear-plate 14, similar to the wear-plate 5 on the upper member 1.

Having now described my invention, what I claim as new, and desire to secure by Letters Patent, is—

1. In an antifriction-bearing, two cooperating members, one of which is provided with an elongated channel having a central horizontal bearing-surface and upwardly-inclined portions terminating in end walls separated from each other, and means for retaining antifrictional devices within said channel and for causing the same to move by gravity to their central positions.

2. In an antifriction-bearing, two cooperating members, the upper of which is provided with an elongated channel having upwardly-extending end portions, which terminate in end walls separated from each other, and means for retaining antifrictional devices within said channel.

3. In an antifriction-bearing, two cooperating members, the upper of which is provided with an elongated channel having a central horizontal bearing-surface and upwardly-extending inclined end portions terminating in end walls separated from each other, and means for retaining antifrictional devices within said channel.

4. In an antifriction-bearing, two cooperating members, one of which is provided with an elongated channel for the reception of antifrictional devices, the said channel having upwardly-extending end portions terminating in end walls which are separated from each other and a cover for said channel having inclined ends and an opening through which said antifrictional devices are adapted to project.

5. In an antifriction-bearing, two cooperating members, one of which is provided with an elongated channel for the reception of antifrictional devices, the said channel having a central horizontal bearing-surface and upwardly-inclined end portions terminating in concave end walls which are separated from each other and a cover for said channel having a central horizontal portion and upwardly-inclined ends and having an opening therein along its central portion through which said antifrictional devices may project.

6. In an antifriction-bearing, two cooperating members, one of which is provided with an elongated channel for the reception of antifrictional devices, the said channel having upwardly-extending inclined end portions terminating in concave end walls which are separated from each other, a removable, horizontally-disposed wear-plate for the central portion of said channel, and a cover for said channel having a central horizontal portion and upwardly-inclined ends and having an opening therein through which said antifrictional devices may project.

In testimony whereof I have hereunto set my hand in presence of two subscribing witnesses.

JOHN E. NORWOOD.

Witnesses:
GEO. W. REA,
WM. M. STOCKBRIDGE.